(12) United States Patent
Lin

(10) Patent No.: US 6,585,440 B2
(45) Date of Patent: Jul. 1, 2003

(54) FOLDING KEYBOARD HAVING KEY MODULES WITH ASYMMETRICAL CONNECTION POINTS

(75) Inventor: Winky Lin, Taipei (TW)

(73) Assignee: Silitek Corporation, Taipei (TW)

( * ) Notice: Subject to any disclaimer, the term of this patent is extended or adjusted under 35 U.S.C. 154(b) by 26 days.

(21) Appl. No.: 09/891,467

(22) Filed: Jun. 27, 2001

(65) Prior Publication Data
US 2003/0002900 A1 Jan. 2, 2003

(51) Int. Cl.[7] .............................. B41J 29/02; G06F 1/16
(52) U.S. Cl. .......................... 400/681; 400/680; 400/82; 400/472; 341/22; 345/168
(58) Field of Search ................................ 400/472, 489, 400/88, 82, 680, 681, 684, 685, 492, 486; 341/21, 22, 23; 345/168, 169; 235/145 R, 145 A, 146; 200/5 A, 5 R; 361/680

(56) References Cited

U.S. PATENT DOCUMENTS

| 5,457,453 A | * | 10/1995 | Chiu et al. ..................... 341/22 |
| 5,653,543 A | | 8/1997 | Abe ............................ 400/489 |
| 5,687,058 A | * | 11/1997 | Roylance ..................... 361/680 |
| 6,256,017 B1 | * | 7/2001 | Bullister ...................... 345/168 |
| 2002/0003530 A1 | * | 1/2002 | Hsu et al. .................... 345/168 |
| 2002/0033761 A1 | * | 3/2002 | Katakami et al. ............. 341/22 |
| 2002/0050934 A1 | * | 5/2002 | Olodort et al. ............... 341/22 |

* cited by examiner

Primary Examiner—Leslie J. Evanisko
(74) Attorney, Agent, or Firm—Rabin & Berdo, P.C.

(57) ABSTRACT

A folding keyboard includes a fixed key module and one or more mobile key modules. The key modules are joined together by links between them. Two ends of the links between the key modules are joined at asymmetric positions. The mobile key module can turn 180 degrees to lie against the fixed key module. The folding keyboard is capable of being frontally folded, showing the whole arrangement of keys after unfolding, and being used immediately after unfolded. Moreover, the folding keyboard can be relatively shrunk by way of compression of the key units to reduce the thickness, and can be designed to be a triply-folded or quadruply-folded structure.

4 Claims, 10 Drawing Sheets

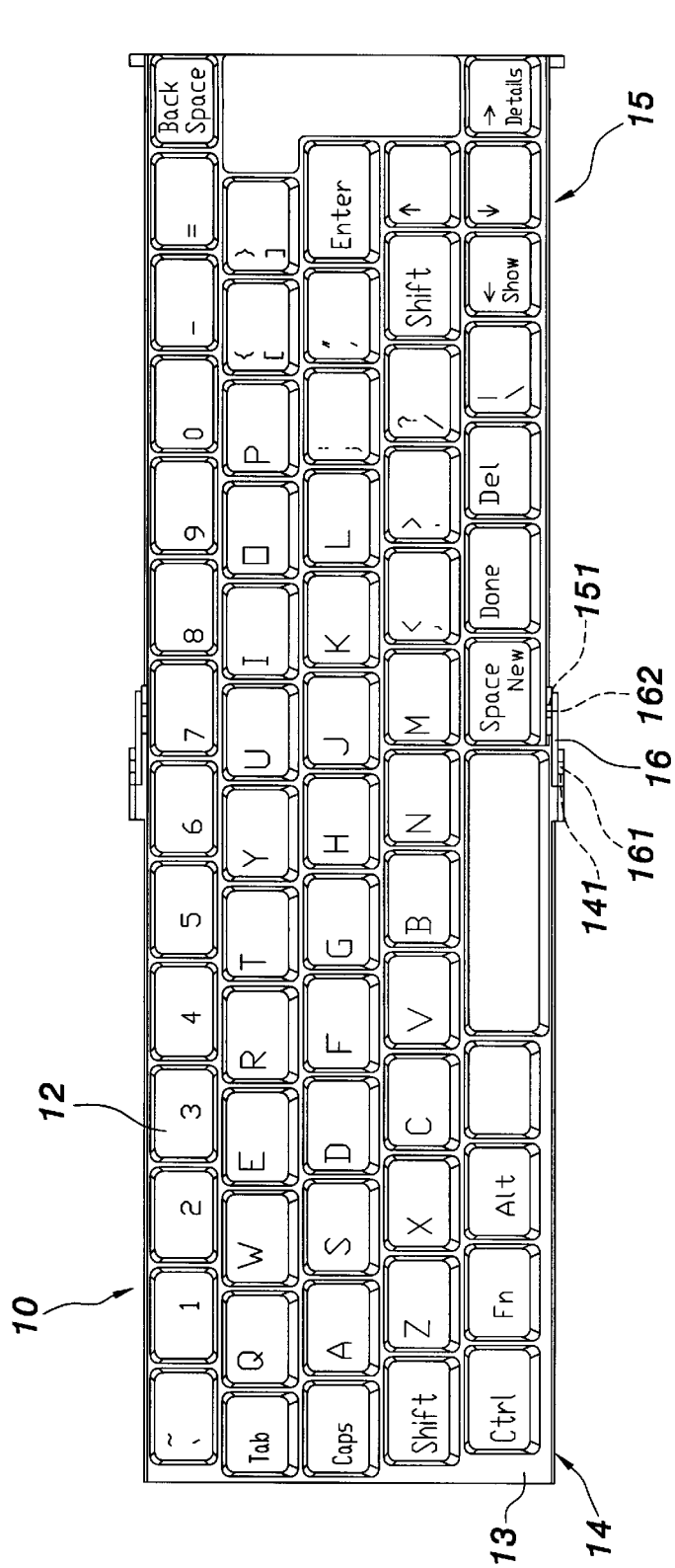
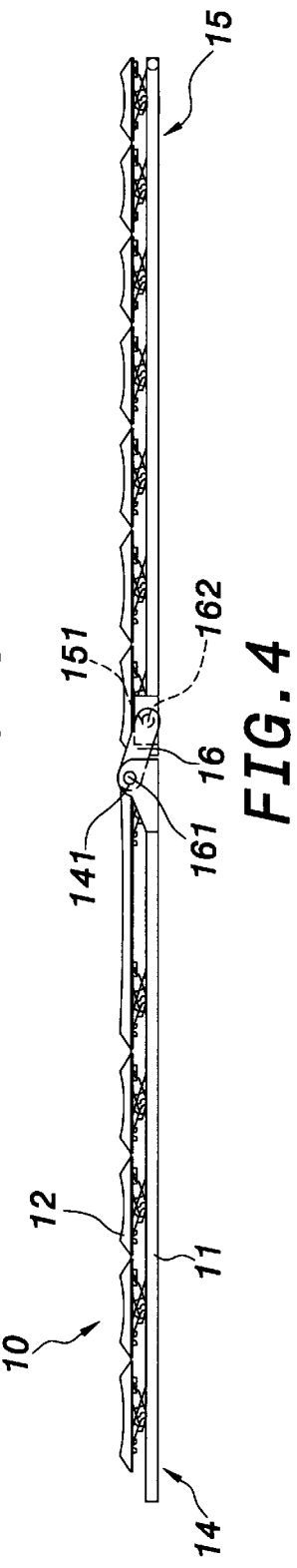
FIG. 3
FIG. 4

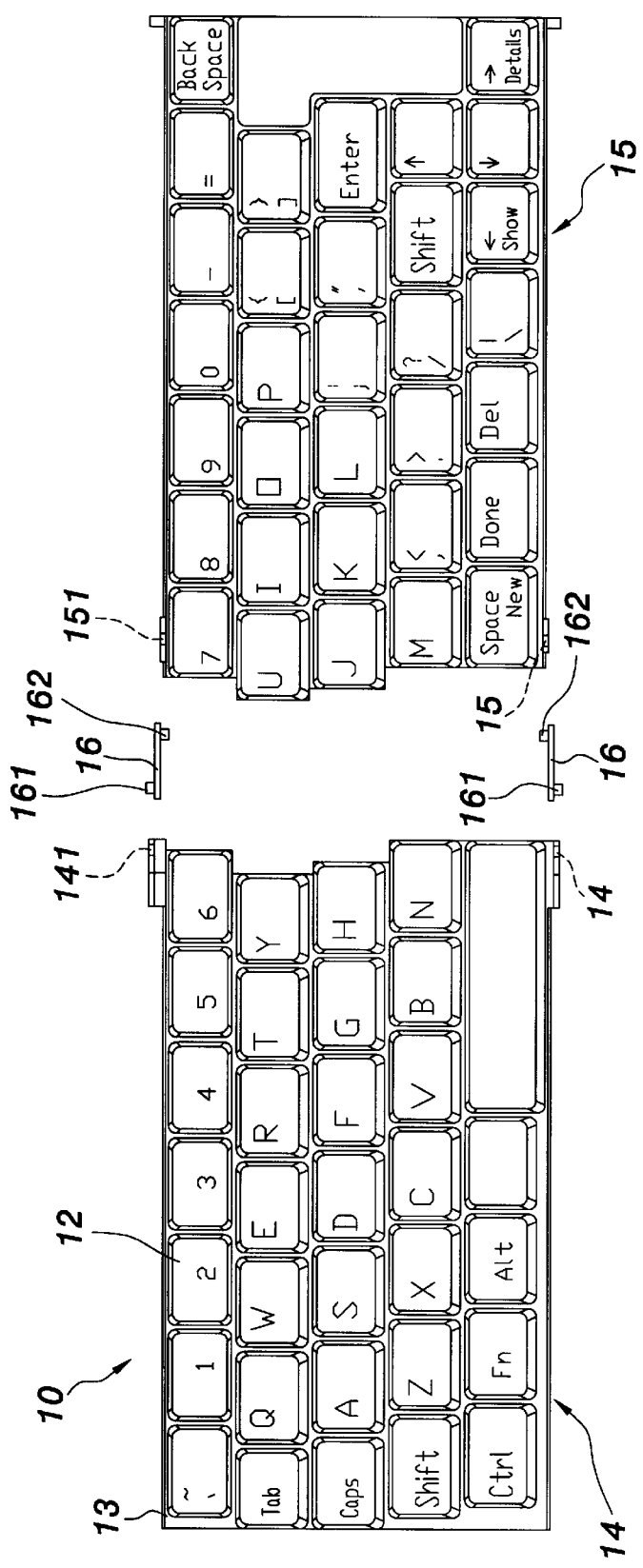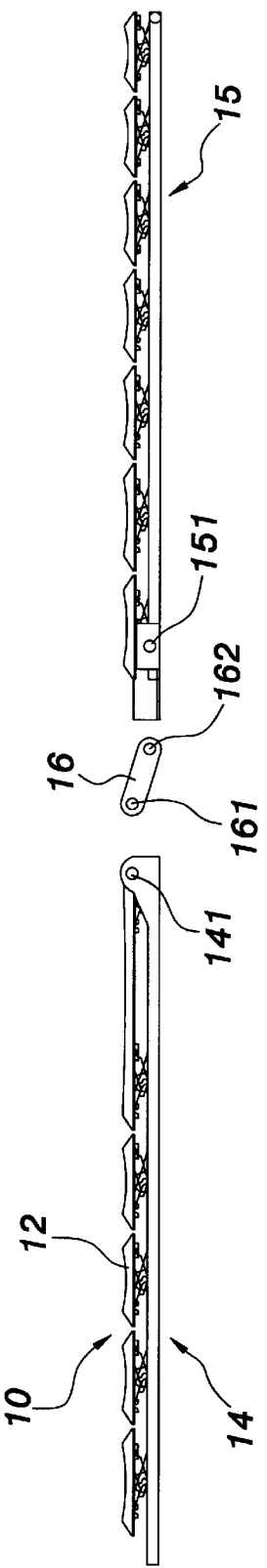
FIG. 5
FIG. 6

FOLDING KEYBOARD HAVING KEY MODULES WITH ASYMMETRICAL CONNECTION POINTS

FIELD OF THE INVENTION

The present invention relates to a folding keyboard and, more particularly, to a folding keyboard for input especially applicable to electric portable devices such as personal digital assistants (PDAs) and mobile phones.

BACKGROUND OF THE INVENTION

Along with the progress of information technology, automated equipment is gradually being supplied to every company and home, so that people have much more opportunities of dealing with keyboards. For instance, people use keyboards to communicate with computers, personal digital assistants (PDAs), mobile phones, and cash registers to input the instructions thereof.

In order to let keyboards be miniature and portable, folding keyboards have been proposed. However, in general a folding keyboard cannot be frontally folded, cannot show a whole arrangement of keys after being unfolded, or cannot be immediately used after being unfolded.

FIGS. 1 and 1A show a prior art folding keyboard proposed in U.S. Pat. No. 5,653,543, wherein a folding keyboard 10a is divided into a first key module 11a and a second key module 12a. The first and second key modules 11a and 12a are joined together by a plurality of connection parts 13a, so that they can be frontally folded, letting the keyboard be miniature and portable.

When the first and second key modules 11a and 12a of the above folding keyboard 10a are folded, circular arc faces are exploited for guidance, and they are turned along an axis 14a. Therefore, after the first and second key modules 11a and 12a are folded, they cannot be further shrunk to reduce the thickness. Moreover, multi-fold design cannot be accomplished, so that the miniature and portable functions of the keyboard cannot be further enhanced.

Accordingly, the prior art folding keyboard has inconvenience and drawbacks in practical use. The present invention aims to resolve the above problems.

SUMMARY OF THE INVENTION

The primary object of the present invention is to provide a folding keyboard, which can be frontally folded, can show a whole arrangement of keys after unfolded, and can be used immediately after unfolded, thereby enhancing convenience of use. Moreover, after the front faces of key modules burrow against each other, the key modules can be relatively shrunk to reduce the thickness, hence enhancing the miniature and portable functions of the keyboard.

To achieve the above object, the present invention provides a folding keyboard comprising a fixed key module and more than one mobile key modules. The fixed key module and the mobile key modules are joined together by links between them. Two ends of the links are joined at asymmetric positions at least between the fixed key module and one of the mobile key modules or between two of the mobile key modules. The mobile key modules can make relative motions with respect to the link and the fixed key module, so that the folding keyboard can be folded.

The various objects and advantages of the present invention will be more readily understood from the following detailed description when read in conjunction with the appended drawing, in which:

BRIEF DESCRIPTION OF THE DRAWINGS

FIG. 3 is a top view of an unfolded keyboard of the present invention;

FIG. 4 is a front view of an unfolded keyboard of the present invention;

FIG. 5 is an exploded top view of an unfolded keyboard of the present invention;

FIG. 6 is an exploded front view of an unfolded keyboard of the present invention;

DETAILED DESCRIPTION OF THE PREFERRED EMBODIMENTS

Figure 1:
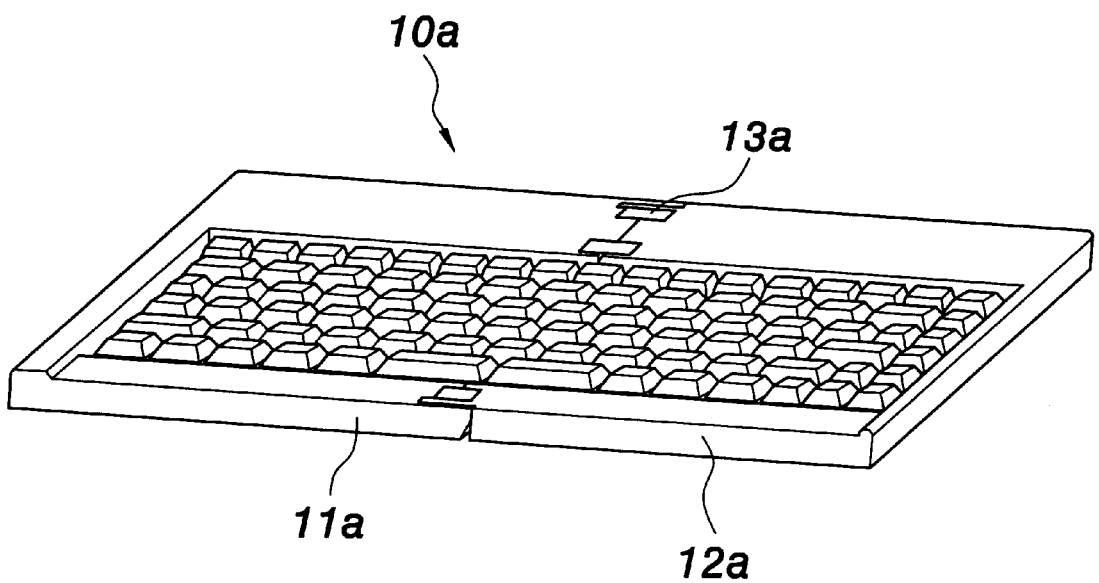
FIG. 1 is a perspective view of a prior art folding keyboard.
Figure 1A:
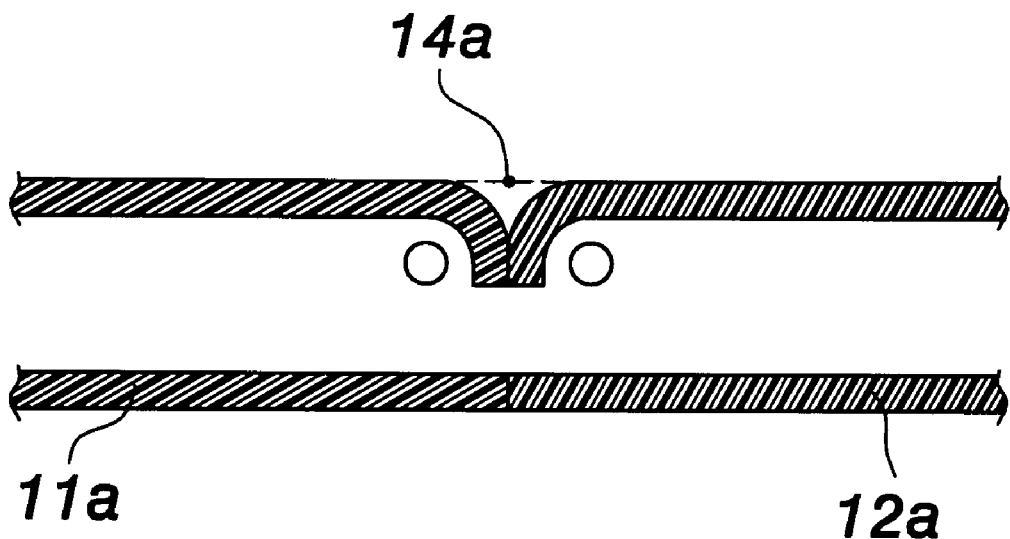
FIG. 1A is a partly cross-sectional view of a prior art folding keyboard.
Figure 2:
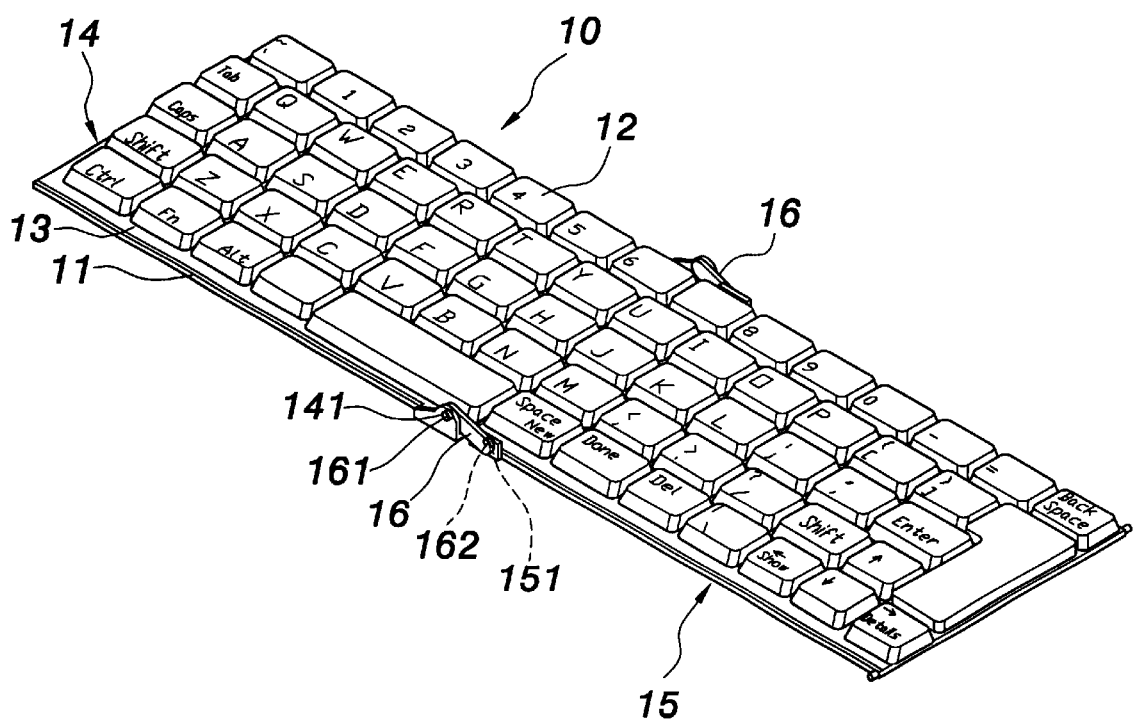
FIG. 2 is a perspective view of an unfolded keyboard of the present invention.
Figure 7:
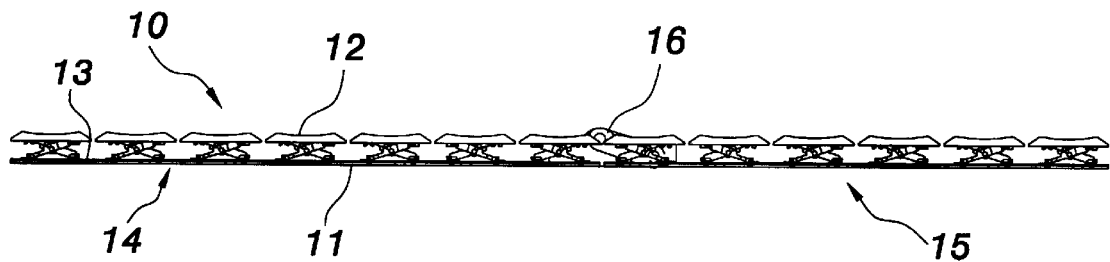
FIG. 7 is a diagram showing the folding action of a keyboard of the present invention.
Figure 8:
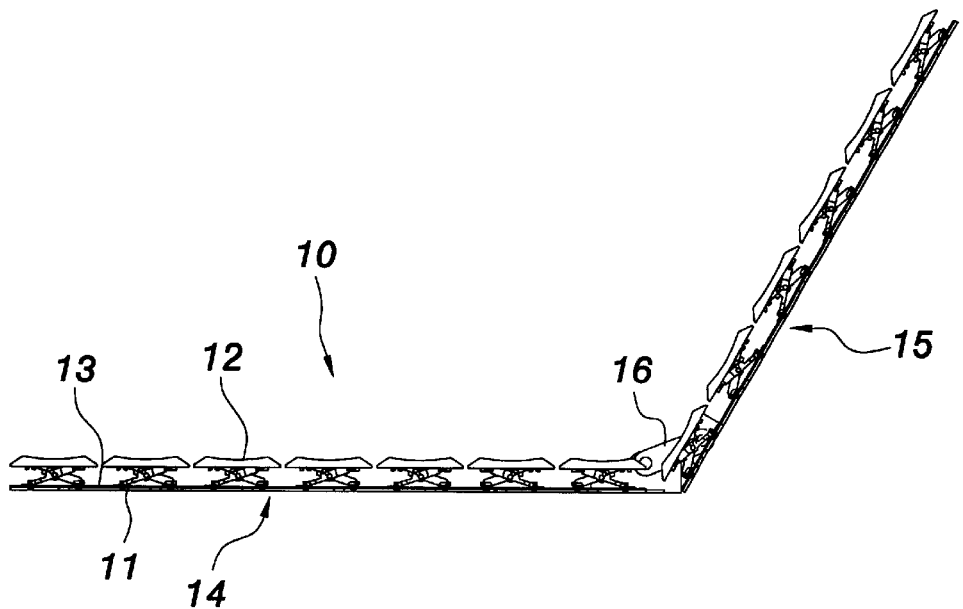
FIG. 8 is another diagram showing the folding action of a keyboard of the present invention.
Figure 9:
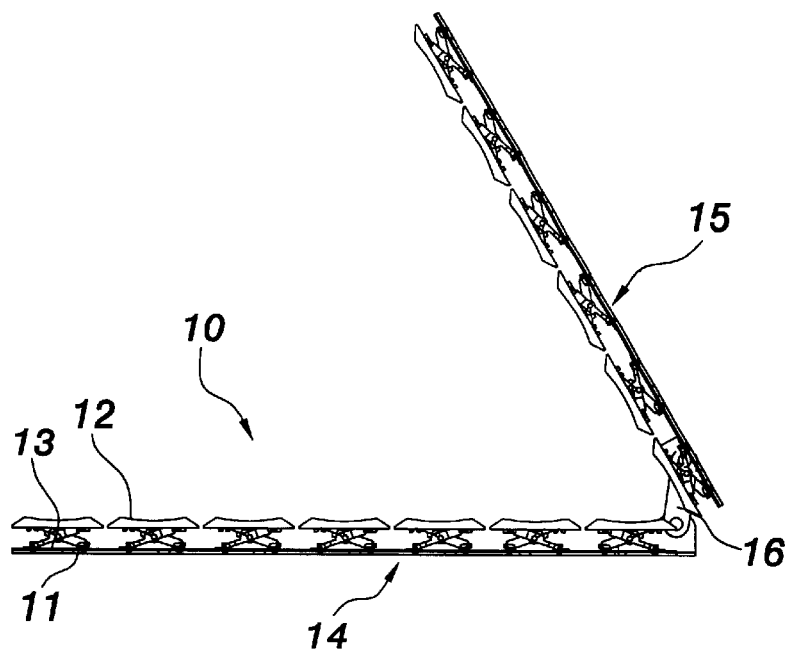
FIG. 9 is another diagram showing the folding action of a keyboard of the present invention.
Figure 10:
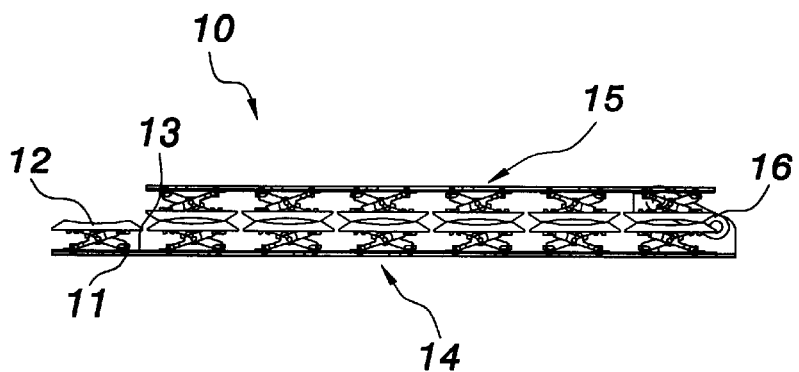
FIG. 10 is another diagram showing the folding action of a keyboard of the present invention.
Figure 11:
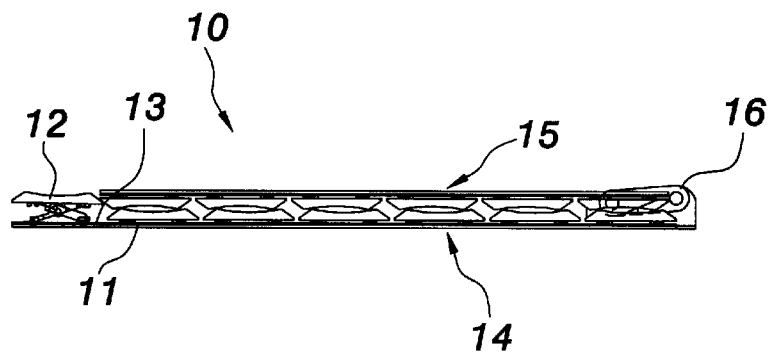
FIG. 11 is another diagram showing the folding action of a keyboard of the present invention.
Figure 12:
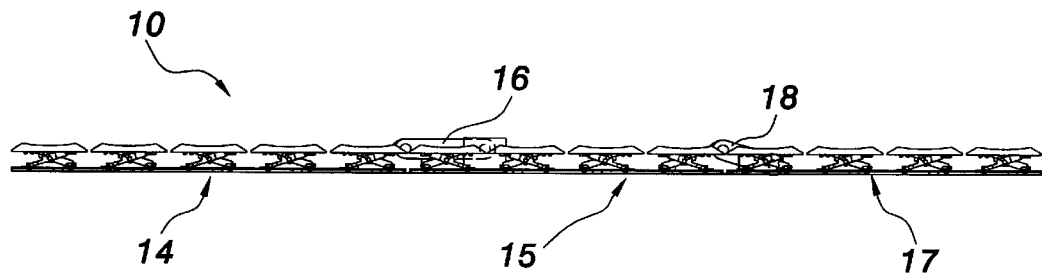
FIG. 12 is a diagram showing the folding action of a keyboard according to another embodiment of the present invention.

As shown in FIGS. 2 to 6, the present invention provides a folding keyboard 10 for input especially applicable to small portable devices such as PDAs and mobile phones. The folding keyboard 10 comprises a base 11 with a plurality of key units 12 thereon. The key units 12 should be scissor-type keys. A circuit board 13 is disposed between the key units 12 and the base 11 to control the on or off actions of keyswitches through pressing the key units 12. The structure of the above keyboard is the same as that of the prior art and thus will not be further described.

The present invention is characterized in that the folding keyboard 10 is divided into a fixed key module 14 and more than one mobile key modules 15. The fixed key module 14 and the mobile key modules 15 are joined together by two links 16 between them. A mobile key module 15 and two links 16 are provided in this embodiment. Of course, the counts of the mobile key modules 15 and the links 16 can be increased according to necessity.

Two ends of the link 16 have a first pivot 161 and a second pivot 162, respectively. A first pivotal hole 141 is disposed at the front and rear sides of the base 11 of the fixed key module 14, respectively. A second pivotal hole 151 is disposed at the front and rear sides of the base 11 of the mobile key module 15, respectively. The second pivotal holes 151 are situated at different height from the first pivotal holes 141. In other words, the first pivotal holes 141 and the second pivotal holes 151 are asymmetrically arranged.

The two ends of the two links 16 are pivotally joined in the first pivotal holes 141 of the fixed key module 14 and the second pivotal holes 151 of the mobile key module 15, respectively. Because the first pivots 161 and the second pivots 162 at the two ends of the links 16 are pivotally joined in the asymmetrically arranged first and second pivotal holes 141 and 151 of the fixed key module 14 and the mobile key module 15, the two links 16 will be slantingly and pivotally joined between the fixed key module 14 and the mobile key module 15. In other words, the fixed key module 14 and the mobile key module 15 are joined together by the two links 16. A folding keyboard of the present invention is thus formed.

As shown in FIGS. 7 to 11, the mobile key module 15 can make relative motions (turn) with respect to the links 16 and the fixed key module 14. The mobile key module 15 can turn 180 degrees to burrow or lie against the front face of the fixed key module 14, so that the folding keyboard 10 can show a frontally folded state (FIG. 10), letting the keyboard be miniature and portable. Moreover, after the mobile key module 15 turns 180 degrees to burrow against the front face of the fixed key module 14, the key units still can be relatively shrunk to reduce the thickness (FIG. 11), so that the keyboard can be completely folded up. Because the mobile key module 15 and the fixed key module 14 can be relatively shrunk to reduce the thickness, the miniature and portable functions of the keyboard can be effectively enhanced.

The present invention provides a folding keyboard, which can be frontally folded, can show a whole arrangement of keys after being unfolded, and can be used immediately after being unfolded, resulting in convenient use. It is not necessary to pull outwards the key modules 14 and 15 to use the keyboard. Moreover, after the front faces of the key modules 14 and 15 of the present invention burrow against each other, the two key modules 14 and 15 can be relatively shrunk to reduce the thickness, hence enhancing the miniature and portable functions of the keyboard.

As shown in FIGS. 12 to 15, in addition to the doubly-folded structure, the folding keyboard 10 of the present invention can also be designed to be a triply-folded or even quadruply-folded structure. In this embodiment, the folding keyboard 10 is designed to be a triply-folded structure. The folding keyboard 10 is divided into a fixed key module 14 and two mobile key modules 15 and 17. The fixed key module 14 and the mobile key module 15 are joined together by two links 16 between them, and the fixed key module 14 and the mobile key module 17 are joined together by two links 18 between them. Two ends of the two links 16 are pivotally joined at symmetric positions of the fixed key module 14 and the mobile key module 15, and two ends of the two links 18 are pivotally joined at asymmetric positions of the two mobile key modules 15 and 17.

Figure 13:
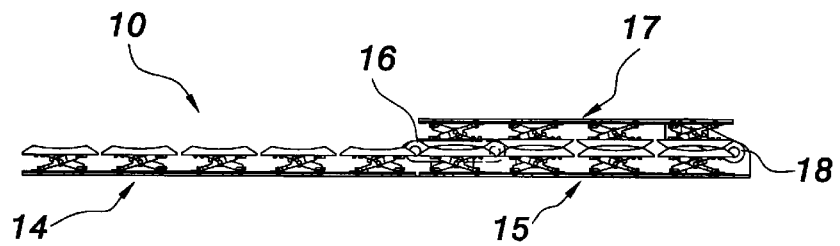
FIG. 13 is another diagram showing the folding action of a keyboard according to another embodiment of the present invention.
Figure 14:
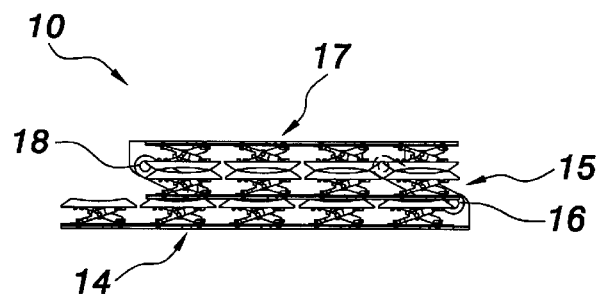
FIG. 14 is another diagram showing the folding action of a keyboard according to another embodiment of the present invention.
Figure 15:
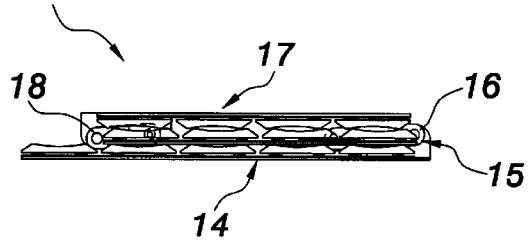
FIG. 15 is another diagram showing the folding action of a keyboard according to another embodiment of the present invention.

The mobile key module 17 can make relative motions with respect to the links 18 and the mobile key module 15. The mobile key module 17 can turn 180 degrees to burrow against the front face of the mobile key module 15 (FIG. 13). The two mobile key modules 15 and 17 then make relative motions (turn) with respect to the links 16 and the fixed key module 14. The two mobile key modules 15 and 17 can turn 180 degrees to burrow against the fixed key module 14, letting the folding keyboard 10 form a triply-folded state (FIG. 14). Moreover, the three key modules can still be relatively shrunk to reduce the thickness (FIG. 15) so that the keyboard can be completely folded up.

Figure 16:
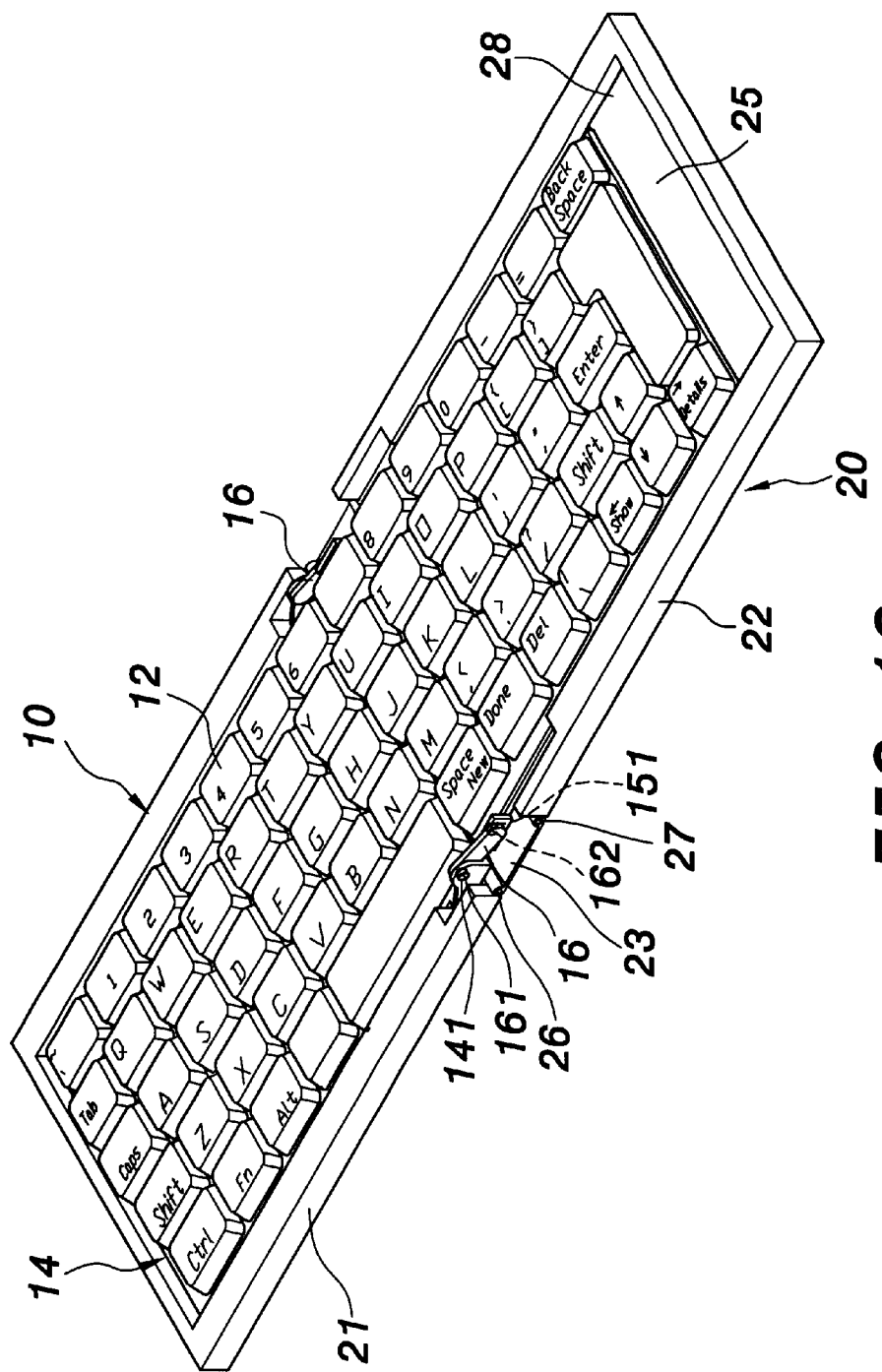
FIG. 16 is a perspective view of a keyboard of the present invention with an outer cover attached.
Figure 17:
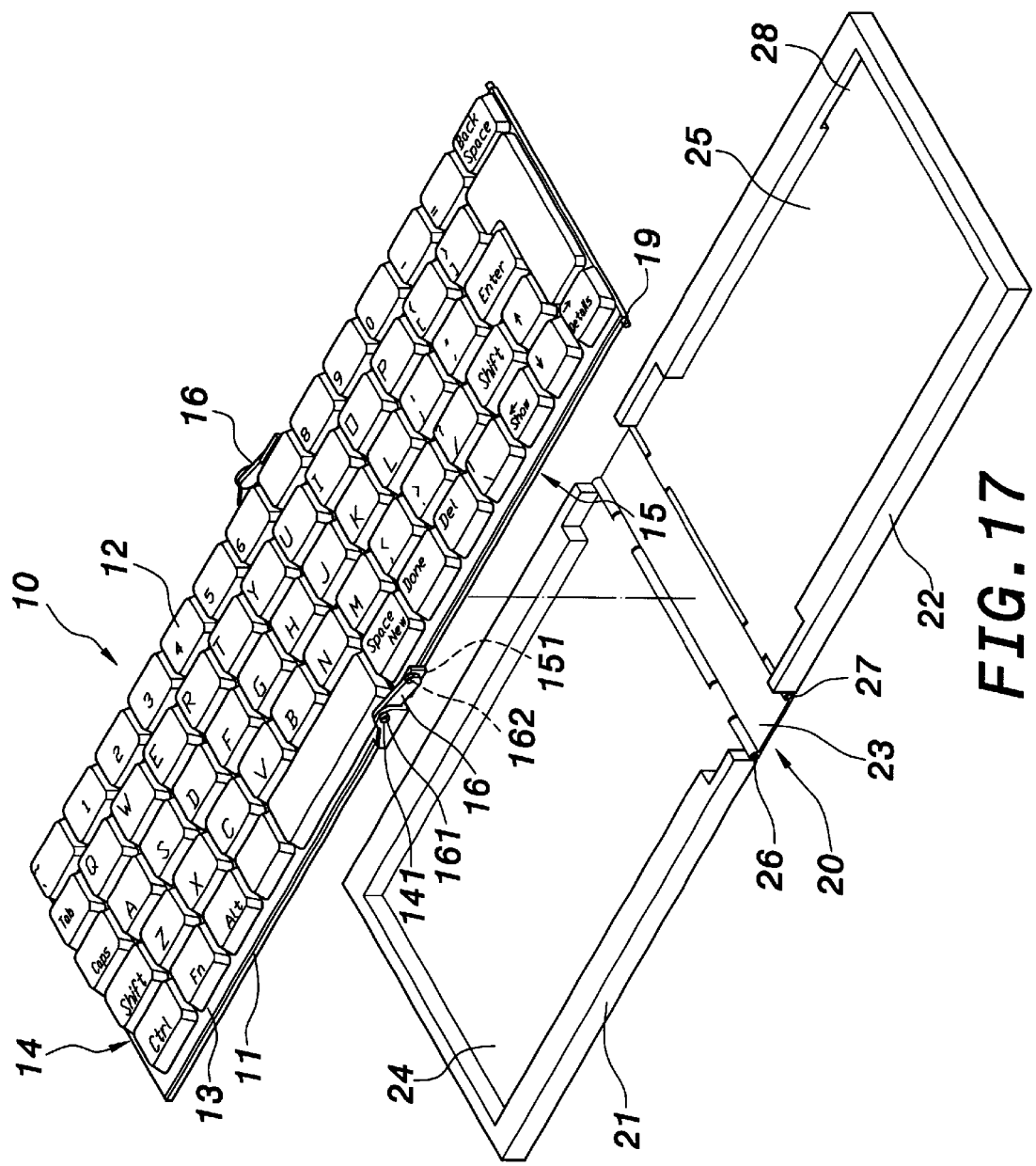
FIG. 17 is an exploded perspective view of a keyboard of the present invention with an outer cover attached.

Additionally, as shown in FIGS. 16 and 17, an outer cover 20 can be attached outside the folding keyboard 10 in the present invention. The outer cover 20 comprises a first cover plate 21, a second cover plate 22, and a pivotal plate 23. The insides of the first and second cover plates 21 and 22 form receiving spaces 24 and 25, respectively, to receive the folding keyboard 10. Two sides of the pivotal plate 23 are pivotally joined at one side of the first and second cover plates 21 and 22 with pivots 26 and 27, respectively. The first and second cover plates 21 and 22 can thus be pivotally joined together through the pivotal plate 23 and the two pivots 26 and 27.

The fixed key module 14 of the folding keyboard 10 can be received and fixed in the receiving space 24 of the first cover plate 21. The mobile key module 15 of the folding keyboard 10 can be received and movably disposed in the receiving space 25 of the second cover plate 22. Two opposite sides in the receiving space 25 have guide grooves 28, and two opposite sides of the mobile key module 15 have guide poles 19. The guide poles 19 are matched with the guide grooves 28 to guide the mobile key module 15 to slide in the receiving space 25. Therefore, the first and second cover plates 21 and 22 of the outer cover 20 can successfully form a folded state, and the folding keyboard 10 can be received into the outer cover 20.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A folding keyboard comprising:

a first key module;

a second mobile key module;

a pair of spaced-apart links joining said first and second key modules for movement between an open state and a folded state, each of said links having two ends that are pivotably connected to said first and second key modules at asymmetrical connection points which have different heights when said keyboard is in its open state; and an outer cover that includes a first cover plate having a receiving space, a second cover plate having a receiving space, and a pivotal plate joined between said first and second cover plates, said first key module being fixed in the receiving space of said first cover plate and said second key module being movably disposed in the receiving space of said second cover plate.

2. The folding keyboard as claimed in claim 1, wherein two opposite sides in the receiving space of said second cover plate have guide grooves, two opposite sides of said second key module have guide poles, and said guide poles are matched with said guide grooves.

3. A folding keyboard comprising:

a fixed key module;

more than one mobile key module;

a plurality of links movably joining said key modules, each link having two ends, the ends of the links joining said fixed key module and one of said mobile key modules or joining two of said mobile key modules being disposed at asymmetrical positions; and an outer cover, said outer cover comprising a first cover plate, a second cover plate, and a pivotal plate, the insides of said first and second cover plates respectively forming receiving spaces, said fixed key module being fixed in said receiving space of said first cover plate, and said mobile key modules being movably disposed in said receiving space of said second cover plate.

4. The folding keyboard as claimed in claim 3, wherein two opposite sides in said receiving space of said second cover plate have guide grooves, two opposite sides of said mobile key modules have guide poles, and said guide poles are matched with said guide grooves.

* * * * *